(12) United States Patent
Kakihara (10) Patent No.: US 10,221,941 B2
(45) Date of Patent: Mar. 5, 2019

(54) CONTROL DEVICE FOR AUTOMATIC TRANSMISSION

(71) Applicant: SUBARU CORPORATION, Tokyo (JP)

(72) Inventor: Yusuke Kakihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 57 days.

(21) Appl. No.: 15/483,953

(22) Filed: Apr. 10, 2017

(65) Prior Publication Data

US 2017/0299052 A1 Oct. 19, 2017

(30) Foreign Application Priority Data

Apr. 19, 2016 (JP) .................................. 2016-083961

(51) Int. Cl.
*F16H 59/02* (2006.01)
*F16H 59/18* (2006.01)
(Continued)

(52) U.S. Cl.
CPC ......... *F16H 61/0213* (2013.01); *F16H 59/18* (2013.01); *F16H 59/44* (2013.01);
(Continued)

(58) Field of Classification Search
CPC ....... F16H 2059/0247; F16H 2059/183; F16H 2059/405; F16H 61/0213
See application file for complete search history.

(56) References Cited

U.S. PATENT DOCUMENTS

| 6,216,073 B1 | 4/2001 | Horiguchi et al. |
| 8,589,040 B2 * | 11/2013 | Nishida .................. F16H 59/20 477/34 |

(Continued)

FOREIGN PATENT DOCUMENTS

| JP | H10-299882 A | 11/1998 |
| JP | 2012-122549 | 6/2012 |
| JP | 2012-137118 A | 7/2012 |

OTHER PUBLICATIONS

Japanese Office Action dated Feb. 13, 2018 in Japanese Application No. 2016-083961 with an English translation thereof.

*Primary Examiner* — Tisha D Lewis
(74) *Attorney, Agent, or Firm* — McGinn I.P. Law Group, PLLC.

(57) ABSTRACT

A control device of a continuously variable transmission has at least an automatic shift mode and a temporary manual mode. The control device includes an insufficient drive force determination unit, a first insufficient acceleration determination unit, and a downshift control unit. The insufficient drive force determination unit determines whether drive force insufficiency occurs if acceleration is performed in the current transmission gear. The first insufficient acceleration determination unit determines whether there is an acceleration request made by the driver of the vehicle. The downshift control unit downshifts from the current transmission gear to a transmission gear at a lower speed side in a case where, in the temporary manual mode, the insufficient drive force determination unit determines that a drive force insufficiency occurs and the first acceleration request determination unit determines that there is an acceleration request.

15 Claims, 6 Drawing Sheets

(51) Int. Cl.
*F16H 59/40* (2006.01)
*F16H 61/02* (2006.01)
*F16H 59/44* (2006.01)
*F16H 59/66* (2006.01)
*F16H 59/70* (2006.01)
*F16H 59/36* (2006.01)

(52) U.S. Cl.
CPC .............. *F16H 59/66* (2013.01); *F16H 59/70* (2013.01); *F16H 2059/183* (2013.01); *F16H 2059/366* (2013.01); *F16H 2059/663* (2013.01); *F16H 2061/0244* (2013.01)

(56) References Cited

U.S. PATENT DOCUMENTS

| | | | |
|---|---|---|---|
| 8,666,617 B2* | 3/2014 | Ajimoto | F16H 61/0213 701/52 |
| 2011/0130928 A1* | 6/2011 | Matsunaga | F16H 61/10 701/52 |
| 2012/0166053 A1 | 6/2012 | Nishida et al. | |

* cited by examiner

CONTROL DEVICE FOR AUTOMATIC TRANSMISSION

CROSS-REFERENCES TO RELATED APPLICATIONS

The present application claims priority from Japanese Patent Application No. 2016-083961 filed on Apr. 19, 2016, the entire contents of which are hereby incorporated by reference.

BACKGROUND

1. Technical Field

The present invention relates to a control device for an automatic transmission having at least an automatic shift mode and a temporary manual mode.

2. Related Art

There are automatic transmissions which have, in addition to an automatic shift mode where shifting is automatically performed in accordance with the state in which the vehicle is traveling, a temporary manual mode (temporary manual gearshift mode) where, when the driver performs a gearshift operation (e.g., operating a downshift paddle switch or operating an upshift paddle switch) while in automatic shift mode, the transmission is shifted down or shifted up in accordance with the gearshift operation. In order to cancel this temporary manual mode, the driver needs to perform operations satisfying cancelation conditions. Cancelation conditions include, for example, operation of a shift lever, maintaining steady-state traveling for a predetermined amount of time, or a kick-down operation (e.g., full-open of the accelerator pedal).

Now, there are cases where engine revolutions have dropped due reduced speed or the like, in a state where the driver has shifted to select a high-speed transmission gear (e.g., a case where the driver has selected a high-speed transmission gear to suppress fuel consumption) in temporary manual mode. In this case, even if the driver requests acceleration by operating the accelerator, there are cases where engine torque necessary for acceleration cannot be generated due to the low engine revolutions. In this case, acceleration in response to the driver's intent to accelerate cannot be realized due to insufficient drive force. Obtaining sufficient acceleration in such a case requires shifting down from the current transmission gear.

Shifting down from the current transmission gear requires an operation of canceling the temporary manual mode to return to the automatic shift mode (e.g., operating a shift lever or performing accelerator operations to maintain steady-state traveling for a predetermined amount of time) or performing a gearshift operation (e.g., operating a paddle switch for downshifting). This operation must be made in addition to acceleration operations of requesting acceleration, which may seem troublesome to the driver. Although the temporary manual mode may be cancelled by a kick-down operation, kick-down control generates a great change in drive force, so the acceleration may be rapid, unlike the acceleration that the driver intended.

There are automatic transmission control devices where the vehicle automatically performs downshifting during temporary manual mode, even if the driver has not performed gearshift operations. For example, Japanese Unexamined Patent Application Publication (JP-A) No. 2012-122549 discloses automatically downshifting transmission gears in a case where a predetermined traveling state is identified during temporary manual mode.

The technology disclosed in JP-A No. 2012-122549 controls deceleration by downshifting in a case where sudden deceleration is identified in temporary manual mode, due to the driver suddenly letting up on the accelerator or braking. However, the technology disclosed in JP-A No. 2012-122549 does not automatically downshift in a case where the driver has performed acceleration operations while in the temporary manual mode. Accordingly, acceleration in response to the driver's intent to accelerate cannot be realized when the state of the vehicle is such that acceleration is insufficient in the transmission gear that the driver has selected.

SUMMARY OF THE INVENTION

It is desirable to provide a control device for an automatic transmission in which acceleration in response to a driver's intent to accelerate can be realized without troubling the driver, even when there is an acceleration request made by the driver while in temporary manual mode and acceleration is insufficient in the current transmission gear.

A control device for an automatic transmission according to an aspect of the present invention is a control device for an automatic transmission that has at least an automatic shift mode where gearshift is performed automatically in accordance with a state in which a vehicle is traveling, and a temporary manual mode where a transmission gear is temporarily downshifted or upshifted in accordance with driver operations until cancelation conditions are established in the automatic shift mode. The control device includes: an insufficient drive force determination unit configured to determine whether drive force insufficiency occurs in a case where acceleration is performed in a transmission gear selected by the driver in the temporary manual mode; an acceleration request determination unit configured to determine whether there is an acceleration request made by the driver of the vehicle; and a downshift control unit configured to downshift to a transmission gear on a lower speed side from the transmission gear selected by the driver, in a case where, in the temporary manual mode, determination is made by the insufficient drive force determination unit that the drive force insufficiency occurs and determination is made by the acceleration request determination unit that there is the acceleration request.

The control device may further include: a high engine revolutions determination unit configured to determine whether a first number of engine revolutions that rise in a case of downshifting from the transmission gear selected by the driver to a transmission gear on the lower speed side is lower than a permissible revolutions number; and a second acceleration request determination unit configured to determine whether there is an acceleration request greater than the acceleration request determined by the acceleration request determination unit. Even in a case where determination is made in the temporary manual mode by the insufficient drive force determination unit that the drive force insufficiency does not occur, the downshift control unit may perform downshift from the transmission gear selected by the driver to a transmission gear on the lower speed side, in a case where determination is made by the high engine revolutions determination unit that the first number of the rising engine revolutions is lower than the permissible revolutions number, and determination is made by the second acceleration request determination unit that there is the great acceleration request.

The control device may further include an engine revolutions detection unit configured to detect a second number of engine revolutions of the vehicle. The insufficient drive force determination unit may determines whether the second number of the engine revolutions detected by the engine revolutions detection unit is lower than a first engine revolutions threshold value, and in a case where the second number of the engine revolutions is lower than the first engine revolutions threshold value, determines that the drive force insufficiency occurs.

The first engine revolutions threshold value may be set in accordance with either one or both of the transmission gear selected by the driver and a road grade of a road over which the vehicle is traveling.

The high engine revolutions determination unit may determine whether the second number of the engine revolutions detected by the engine revolutions detection unit is lower than a second engine revolutions threshold value that is higher than the first engine revolutions threshold value, and in a case where determination is made that the second number of the engine revolutions is lower than the second engine revolutions threshold value, may determine that the first number of the rising engine revolutions is lower than the permissible revolutions number.

The second engine revolutions threshold value may be set in accordance with either one or both the transmission gear selected by the driver and a road grade of a road over which the vehicle is traveling.

The control device may further include an accelerator opening detection unit configured to detect an accelerator opening according to an accelerator pedal operation by the driver. The acceleration request determination unit may determine whether the accelerator opening detected by the accelerator opening detection unit is equal to or greater than a first accelerator opening threshold value, and in a case where the accelerator opening is equal to or greater than the first accelerator opening threshold value, may determine that there is the acceleration request.

The first accelerator opening threshold value may be set in accordance with either one or both of the transmission gear selected by the driver, a road grade of a road over which the vehicle is traveling, or vehicular speed.

The control device may further include an accelerator opening detection unit configured to detect an accelerator opening according to an accelerator pedal operation by the driver. The acceleration request determination unit may determine whether an accelerator depressing speed calculated from the accelerator opening detected by the accelerator opening detection unit is equal to or greater than an accelerator depressing speed threshold value, and in a case of determining that the accelerator depressing speed is equal to or greater than the accelerator depressing speed threshold value, may determine that there is the acceleration request.

The acceleration request determination unit may determine whether the accelerator opening detected by the accelerator opening detection unit is equal to or greater than the first accelerator opening threshold value, and determine whether the accelerator depressing speed calculated from the accelerator opening detected by the accelerator opening detection unit is equal to or greater than the accelerator depressing speed threshold value, and in a case of determining that the accelerator opening is equal to or greater than the first accelerator opening threshold value and that the accelerator depressing speed is equal to or greater than the accelerator depressing speed threshold value, may determine that there is the acceleration request.

The second acceleration request determination unit may determine whether the accelerator opening detected by the accelerator opening detection unit is equal to or greater than a second accelerator opening threshold value that is greater than the first accelerator opening threshold value, and in a case of determining that the accelerator opening is equal to or greater than the second accelerator opening threshold value, may determine that there is the great acceleration request.

The second acceleration request determination unit may determine whether the accelerator depressing speed calculated from the accelerator opening detected by the accelerator opening detection unit is equal to or greater than the accelerator depressing speed threshold value, and in a case of determining that the accelerator depressing speed is equal to or greater than the accelerator depressing speed threshold value, may determine that there is the great acceleration request.

The second acceleration request determination unit may determine whether the accelerator opening detected by the accelerator opening detection unit is equal to or greater than the second accelerator opening threshold value, and determine whether the accelerator depressing speed calculated from the accelerator opening detected by the accelerator opening detection unit is equal to or greater than the accelerator depressing speed threshold value, and in a case of determining that the accelerator opening is equal to or greater than the second accelerator opening threshold value and that the accelerator depressing speed is equal to or greater than the accelerator depressing speed threshold value, may determine that there is the great acceleration request.

DETAILED DESCRIPTION

An example of the present invention will be described in detail with reference to the drawings. Parts that are the same or equivalent in multiple drawings will be denoted with the same reference numerals. Components that are the same in the drawings will be denoted by the same reference numerals, and redundant description will be omitted.

Figure 1:
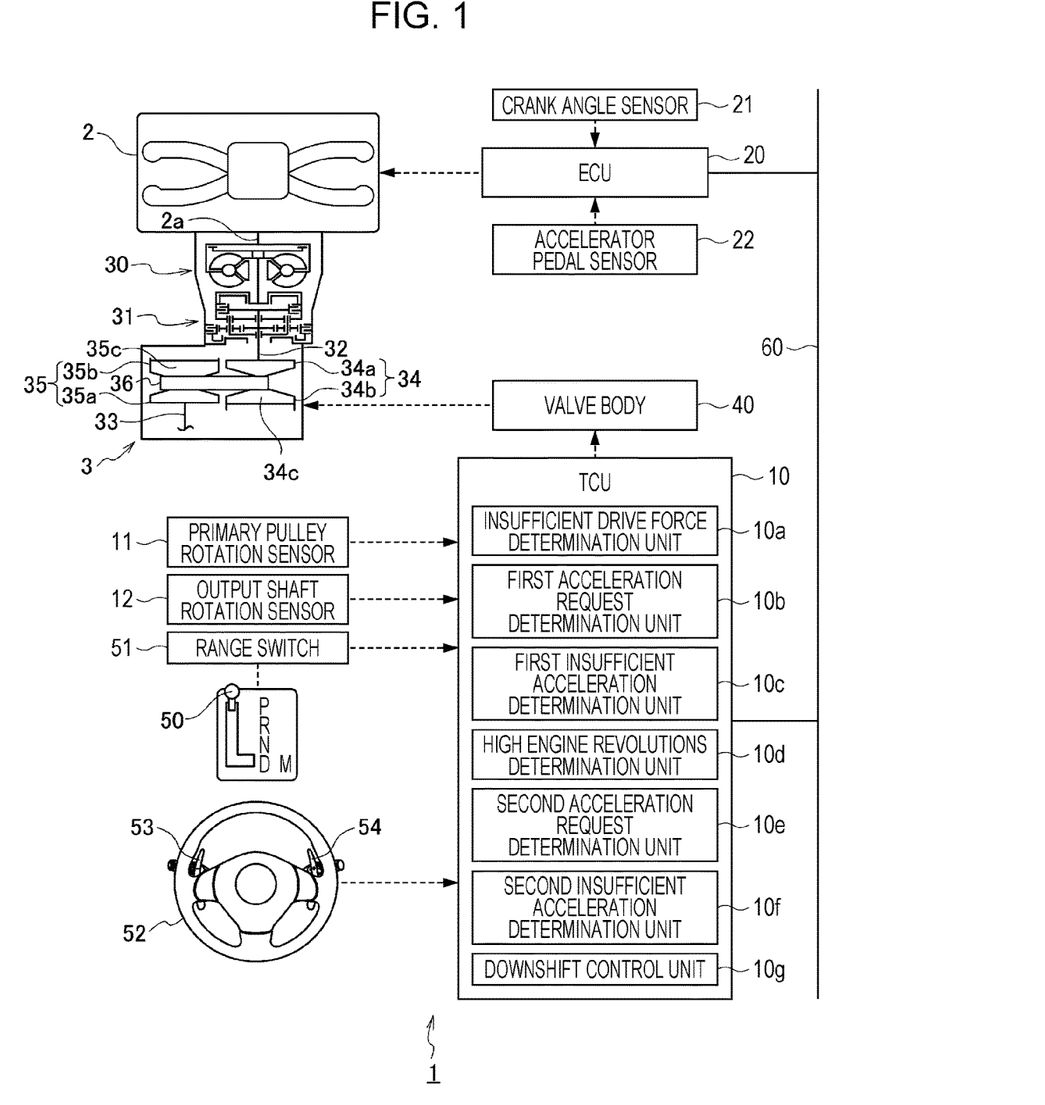
FIG. 1 is a block diagram illustrating the configuration of a control device for a continuously variable transmission according to an example.

An example is applied to a control device 1 of a chain-driven continuously variable transmission (CVT), as a control device of an automatic transmission. The control device 1 for a continuously variable transmission according to the example will be described with reference to FIG. 1. FIG. 1 is a block diagram illustrating the configuration of the control device 1 for a continuously variable transmission according to the example.

Description will be made regarding an engine 2 and continuously variable transmission 3 before describing the control device 1. First, the engine 2 will be described. Although any form of engine may be used for the engine 2, an instance of a horizontally-opposed four-cylinder gasoline engine will be described. The continuously variable transmission 3 is coupled to a crankshaft (output shaft) 2a of the engine 2. The engine 2 is controlled by an engine control unit (ECU) 20.

The ECU 20 is a control device that centrally controls the engine 2. The ECU 20 is configured including a microprocessor which performs computations, read only memory (ROM) which stores programs and so forth so as to cause the microprocessor to execute the various processes, random-access memory (RAM) which stores various types of data such as computation results and so forth, a backup RAM which holds the stored contents by way of a 12 V battery, an input/output interface, and so forth.

Various types of sensors are coupled to the ECU 20 to obtain information necessary for control, such as a crank angle sensor 21, an accelerator pedal sensor 22, and so forth. The crank angle sensor 21 detects the rotational angle of the crankshaft (omitted from illustration) of the engine 2. The ECU 20 has a processing unit that calculates engine revolutions based on the rotational angle of the crankshaft. The accelerator pedal sensor 22 detects the accelerator pedal (omitted from illustration) depression amount, which is the opening degree of the accelerator pedal (hereinafter referred to as "accelerator opening"). In the one example, the crank angle sensor 21 and an engine revolutions calculation processing unit of the ECU 20 may serve as an "engine revolutions detection unit", and the accelerator pedal sensor 22 may serve as an "accelerator opening detection unit".

Next, the continuously variable transmission 3 will be described. The continuously variable transmission 3 converts and outputs drive force from the engine 2. The continuously variable transmission 3 includes a torque converter 30 and a forward/reverse switching mechanism 31. The continuously variable transmission 3 also includes a primary shaft 32 coupled to the crankshaft 2a of the engine 2 via the torque converter 30 and forward/reverse switching mechanism 31, and a secondary shaft 33 disposed in parallel with the primary shaft 32. The torque converter 30 has clutching functions and torque amplifying functions. The forward/reverse switching mechanism 31 has functions of switching the drive wheels between forward rotation and reverse rotation (causing the vehicle to travel forward or backward).

The primary shaft 32 is provided with a primary pulley 34. The primary pulley 34 includes a fixed sheave 34a and a movable sheave 34b. The fixed sheave 34a is affixed to the primary shaft 32. The movable sheave 34b faces the fixed sheave 34a and is slidably movable in the axial direction of the primary shaft 32 but not rotatable relative thereto. The primary pulley 34 is configured such that the spacing between the conical faces of the fixed sheave 34a and movable shave 34b (pulley groove width) can be changed.

A secondary pulley 35 is provided on the secondary shaft 33. The secondary pulley 35 includes a fixed sheave 35a and a movable sheave 35b. The fixed sheave 35a is affixed to the secondary shaft 33. The movable sheave 35b faces the fixed sheave 35a and is slidably movable in the axial direction of the secondary shaft 33 but not rotatable relative thereto. The secondary pulley 35 is configured such that the pulley groove width between the fixed sheave 35a and movable sheave 35b can be changed.

A chain 36 runs between the primary pulley 34 and the secondary pulley 35 to transmit drive force. The gear ratio of the continuously variable transmission 3 is steplessly changed by changing the groove widths of the primary pulley 34 and secondary pulley 35 by changing the ratio of the pitch radius of the chain 36 riding on the pulleys 34 and 35 (pulley ratio). The gear ratio i can be expressed by $$i = Rs/Rp$$

where Rp represents the pitch radius of the chain 36 as to the primary pulley 34, and Rs as to the secondary pulley 35.

A primary driving hydraulic fluid chamber (hydraulic cylinder chamber) 34c is formed at the movable sheave 34b of the primary pulley 34. A secondary driving hydraulic fluid chamber (hydraulic cylinder chamber) 35c is formed at the movable sheave 35b of the secondary pulley 35. A gearshift pressure to change the pulley ratio (gear ratio) and a clamp pressure to prevent the chain 36 from slipping is introduced to the primary drive hydraulic fluid chamber 34c. A clamp pressure is introduced to the secondary drive hydraulic fluid chamber 35c.

The oil pressure (gearshift pressure and clamp pressure) for causing the continuously variable transmission 3 to change speeds is supplied from a valve body 40. A control valve mechanism is built into the valve body 40. The control valve body 40 adjusts oil pressure (line pressure) of oil discharged from an oil pump (omitted from illustration) by opening and closing an oil passage formed within the valve body 40, using multiple spool valves (omitted from illustration) and solenoid valves (omitted from illustration) to move the spool valves, for example, thereby supplying adjusted oil pressure to the primary hydraulic chamber 34c and the secondary hydraulic chamber 35c. The control valve mechanism also supplies adjusted oil pressure to the forward/reverse switching mechanism 31 which switches the forward/reverse directions of the vehicle, and so forth, for example.

The continuously variable transmission 3 changes speeds among any number of transmission gears by performing gear shifting in a multi-stage (staged or stepped) manner in particular. The continuously variable transmission 3 has an automatic shift mode, manual shift mode, and temporary manual mode. The automatic shift mode is a mode where downshifting or upshifting the transmission gear is automatically performed in accordance with the state in which the vehicle is traveling. The manual shift mode is where the driver performs gearshift operations for downshifting or upshifting. The temporary manual mode is a mode where the user temporarily performs gearshift operations for downshifting or upshifting until cancelation conditions are satisfied in automatic shift mode. Cancelation conditions include, for example, operation of a shift lever, maintaining steady-state traveling (constant speed traveling by accelerator operations) for a predetermined amount of time, or a kickdown operation (e.g., full-open of the accelerator pedal).

A shift lever (select lever) 50 is provided on the floor (center console) or the like of the vehicle. The shift lever 50 enables selectively switching among a drive range ("D" range), manual range ("M" range), parking range ("P" range), reverse range "R" range), and neutral range ("N" range), for example. Selecting the drive range with the shift lever 50 switches the mode to automatic shift mode, and selecting the manual range switches the mode to manual shift mode. The shift lever 50 has attached thereto a range switch 51. The range switch 51 is coupled so as to operate in conjunction with the shift lever 50, to detect the selected position of the shift lever 50.

Also, behind a steering wheel 52 are provided a minus (−) paddle switch 53 and a plus (+) paddle switch 54. When the minus paddle switch 53 or plus paddle switch 54 is operated when the continuously variable transmission 3 is in the automatic shift mode, the mode switches to the temporary manual mode. The minus paddle switch 53 is a switch for downshifting the speed in manual shift mode or temporary manual mode. The plus paddle switch 54 is a switch for upshifting the speed in manual shift mode or temporary manual mode.

The control device 1 of the continuously variable transmission 3 will be described next. The control device 1 is a control device that centrally controls the continuously variable transmission 3. The control device 1 according to the present example has a downshift function of automatically downshifting on the vehicle side in a case where an acceleration request has been made by the driver in temporary manual mode and determination is made that sufficient acceleration cannot be obtained for the acceleration request at the current transmission gear that the driver has selected (e.g., high-speed transmission gear), such as a case where engine revolutions are low due to deceleration or the like.

Various controls of the control device 1 are realized by a transmission control unit (TCU) 10. The TCU 10 is configured including a microprocessor, ROM, RAM, backup RAM, an input/output interface, and so forth, in the same way as the ECU 20.

Various sensors, such as a primary pulley rotation sensor 11 and output shaft rotation sensor 12 are coupled to the TCU 10, to acquire information necessary for control. Various stiches, such as a range switch 51, the minus paddle switch 53, the plus paddle switch 54, and so forth, are coupled to the TCU 10 to acquire information necessary for control. The TCU 10 receives various types of information from the ECU 20, such as accelerator opening, engine revolutions, and so forth, via a controller area network (CAN) 60.

The primary pulley rotation sensor 11 detects the revolutions of the primary pulley 34. The output shaft rotation sensor 12 detects the revolutions of the output shaft (secondary shaft 33). The TCU 10 calculates the vehicular speed from the revolutions of this output shaft. Vehicular speed may be the vehicular speed (vehicle body speed) calculated from wheel speed detected by wheel speed sensors provided to the wheels, for example. The TCU 10 receives this vehicular speed from the CAN 60, for example.

When the drive range is detected by the range switch 51, the TCU 10 switches the mode to automatic shift mode. In the automatic shift mode, the TCU 10 follows a gearshift map to perform control of automatically change the gear ratio in accordance with the state in which the vehicle is traveling. In Particular, the TCU 10 performs multi-stage-like control where the gear ratio (transmission gear) is changed in multiple stages. In this multi-stage-like control, a target value is set for primary revolutions to realize any transmission gear in accordance with the state of driving, for example, and the solenoid valves of the valve body 40 are controlled so that the actual primary revolutions (revolutions of the primary pulley 34 detected by the primary pulley rotation sensor 11) become the target primary revolutions, thereby generating gearshift pressure and changing the gear ratio (transmission gear). The gearshift map is a map for changing the gear ratio is multiple stages, and is stored in the ROM of the TCU 10.

When the manual range is detected by the range switch 51, the TCU 10 switches the mode to manual shift mode. In the manual shift mode, the TCU 10 performs gearshift control where downshifting is performed from the current transmission gear to one lower when the minus paddle switch 53 is operated, and performs gearshift control where upshifting is performed from the current transmission gear to one higher when the plus paddle switch 54 is operated.

When the minus paddle switch 53 or the plus paddle switch 54 is operated in automatic shift mode, the TCU 10 switches the mode to temporary manual mode, performs gearshift control where downshifting is performed from the current transmission gear to one lower when the minus paddle switch 53 is operated, and performs gearshift control where upshifting is performed from the current transmission gear to one higher when the plus paddle switch 54 is operated. Further, when in temporary manual mode, the TCU 10 performs gearshift control where downshifting is performed from the current transmission gear to one lower when the minus paddle switch 53 is operated, and performs gearshift control where upshifting is performed from the current transmission gear to one higher when the plus paddle switch 54 is operated. When operations according to cancelation conditions of the above-described temporary manual mode are performed, the TCU 10 switches to the automatic shift mode.

The TCU 10 has a downshift function executed in the temporary manual mode in particular. In order to realize the downshift function, the TCU 10 has an insufficient drive force determination unit 10a, a first acceleration request determination unit 10b, a first insufficient acceleration determination unit 10c, a high engine revolutions determination unit 10d, a second acceleration request determination unit 10e, a second insufficient acceleration determination unit 10f, and a downshift control unit 10g. In one example, the insufficient drive force determination unit 10a may serve as a "drive force determination unit". In one example, the first acceleration request determination unit 10b may serve as an "acceleration request determination unit". In one example, the high engine revolutions determination unit 10d may serve as a "high engine revolutions determination unit". In one example, the second acceleration request determination unit 10e may serve as a "second acceleration request determination unit". In one example, the downshift control unit 10g may serve as a "downshift control unit". These parts 10a through 10g are realized by the TCU 10 executing programs stored in ROM by a microprocessor.

Determination regarding whether insufficient acceleration will result as to an acceleration request made by the driver is determined in two stages in the downshift function, and downshifting is executed in a case where determination is made in either one of the two stages that acceleration is insufficient. The first stage of insufficient acceleration determination is determining whether the current state is such that sufficient acceleration cannot be yielded if the driver depresses the accelerator pedal, due to the engine revolutions being low. This first-stage insufficient acceleration determination is made by the insufficient drive force determination unit 10a, the first acceleration request determination unit 10b, and the first insufficient acceleration determination unit 10c. The second stage of insufficient acceleration determination is determining whether downshifting would result in the engine revolutions after downshifting being too high, in a case where no determination of insufficient acceleration was made in the first-stage insufficient acceleration determination and the driver has deeply depressed the accelerator pedal. This second-stage insufficient acceleration determination is made by the high engine revolutions determination unit 10*d*, the second acceleration request determination unit 10*e*, and the second insufficient acceleration determination unit 10*f*.

The insufficient drive force determination unit 10*a* will be described. The insufficient drive force determination unit 10*a* determines whether the current state is a state where sufficient engine torque cannot be generated since the engine revolutions are too low in the current transmission gear selected by the driver in temporary manual mode (e.g., engine revolutions of 1500 rpm or lower), to where acceleration according to the acceleration intent of the driver cannot be performed due to insufficient excess drive force (drive force that can be used for acceleration of the vehicle). Specifically, the insufficient drive force determination unit 10*a* determines whether the current engine revolutions are lower than a first engine revolutions threshold value. The first engine revolutions threshold value is set in accordance with the current transmission gear and the road grade over which the vehicle is traveling, using a first engine revolutions threshold value map for example. In a case where the insufficient drive force determination unit 10*a* determines that the current engine revolutions are lower than the first engine revolutions threshold value, determination is made that insufficient drive force (excess drive force) will occur.

Figure 2:
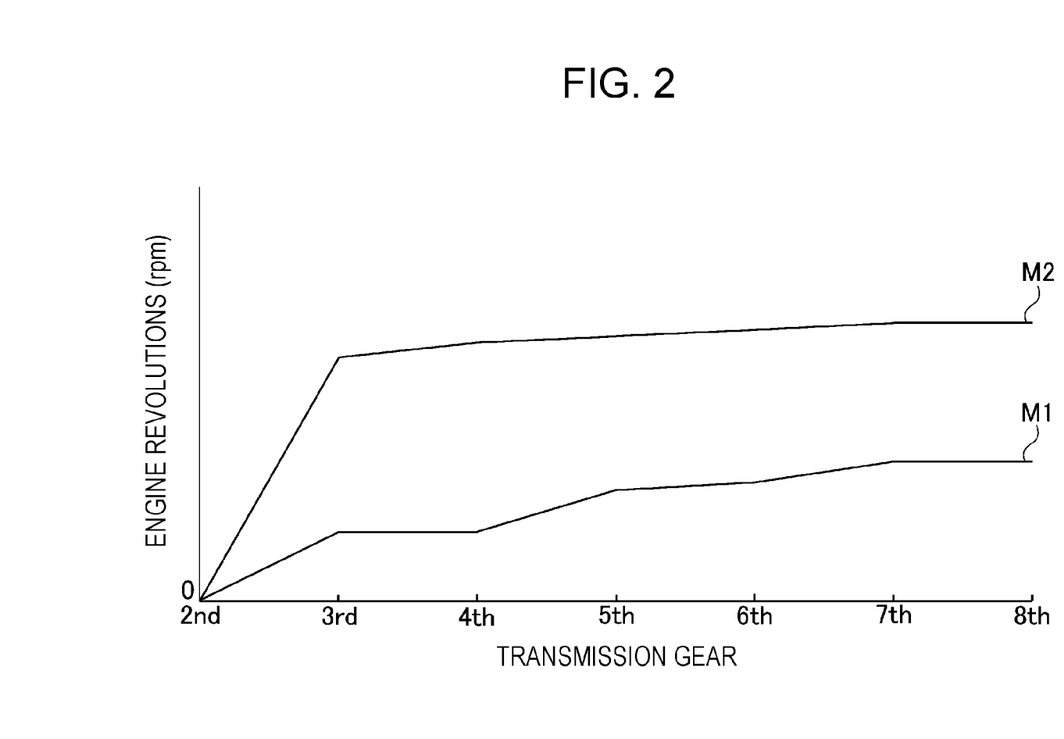
FIG. 2 is a diagram illustrating an example of a first engine revolutions threshold value map used by an insufficient drive force determination unit and a second engine revolutions threshold value map used by a high engine revolutions determination unit, illustrated in FIG. 1.

The first engine revolutions threshold value map will be described with reference to FIG. 2. In FIG. 2, the horizontal axis represents the transmission gear, and the vertical axis represents the engine revolutions (rpms). Eight transmission gears are set in the multi-stage-like control in the example illustrated in FIG. 2. Symbol M1 in FIG. 2 illustrates an instance of a first engine revolutions threshold value map. This first engine revolutions threshold value map M1 is a map for a road grade of 0%, for example. The faster the current transmission gear is, the higher the engine revolutions are set for the first engine revolutions threshold value in the first engine revolutions threshold value map M1. In a case where the current engine revolutions are lower than the engine revolutions indicated by this first engine revolutions threshold value map M1, sufficient engine torque for acceleration cannot be generated, and excess drive force will lack. Such first threshold value maps for engine revolutions are set for each road grade in certain intervals (e.g., 2% grade intervals). The tendency for engine revolutions set by the first threshold value maps for engine revolutions for each road grade is as follows. For example, in a first engine revolutions threshold value map for a steep uphill grade, the engine revolutions are set relatively high as compared to a first engine revolutions threshold value map for a less steep uphill grade. In a first engine revolutions threshold value map for a steep downhill grade, the engine revolutions are set relatively low as compared to a first engine revolutions threshold value map for a less steep downhill grade. The first threshold value maps for engine revolutions for each road grade are decided by matching.

Note that the road grade may be detected by known computation expressions, using vehicular speed detected by a vehicular speed sensor, and front-back acceleration detected by a front-back acceleration sensor, or may be detected using an inclination senor, for example.

The first acceleration request determination unit 10*b* will be described. The first acceleration request determination unit 10*b* determines whether the driver intends to accelerate (acceleration intent). Specifically, the first acceleration request determination unit 10*b* determines whether the accelerator opening is equal to or greater than a first accelerator opening threshold value. The first accelerator opening threshold value is set in accordance with the current transmission gear, road grade that is currently being traversed, and vehicular speed, using a first accelerator opening threshold value map, for example. In a case where determination is made that the accelerator opening is equal to or greater than the first accelerator opening threshold value, the first acceleration request determination unit 10*b* calculates the accelerator depressing speed (differential value of accelerator opening) from time-sequence data of the accelerator opening, and determines whether the accelerator depressing speed is equal to or greater than a first accelerator depressing speed threshold value. In a case where determination is made that the accelerator opening is equal or greater than the first accelerator opening threshold value, and also that the accelerator depressing speed is equal to or greater than the accelerator depressing speed threshold value, the first acceleration request determination unit 10*b* determines that there is an acceleration request.

Figure 3:
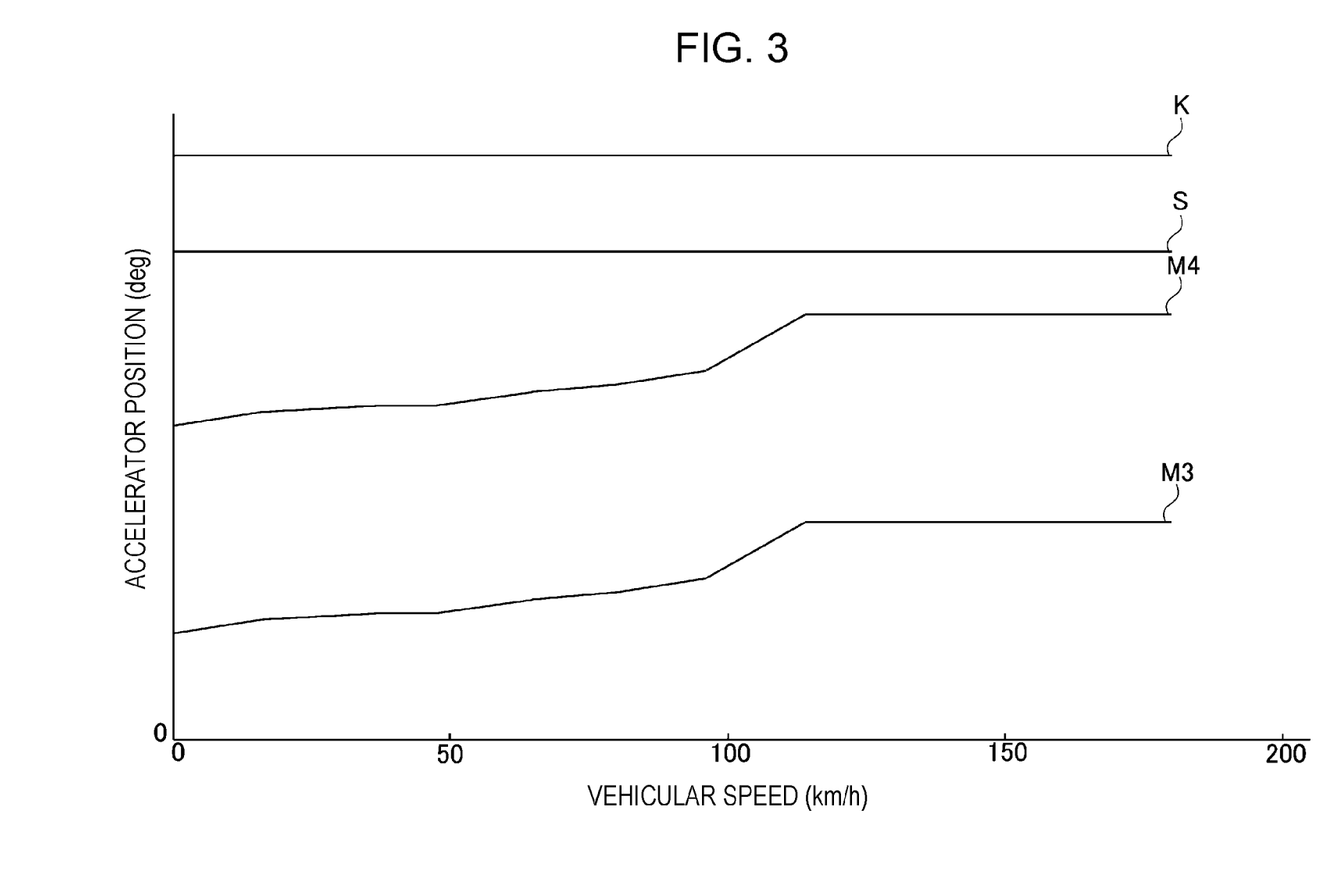
FIG. 3 is a diagram illustrating a first threshold value map for accelerator opening used by a first acceleration request determination unit, and a second threshold value map for accelerator opening used by a second acceleration request determination unit, illustrated in FIG. 1.

A first accelerator opening threshold value map will be described with reference to FIG. 3. The horizontal axis in FIG. 3 is vehicular speed (km/h), and the vertical axis is accelerator opening (degrees). The graph in FIG. 3 denoted by symbol M4 illustrates an example of a first accelerator opening threshold value map. The first accelerator opening threshold value map M4 is set based on a steady-state traveling threshold value map M3 used to determine steady-state traveling (constant speed traveling), which is one of cancelation conditions of the temporary manual mode.

First, the steady-state traveling threshold value map M3 will be described. The steady-state traveling threshold value map M3 is a map for a situation where the vehicle is traveling with the transmission gear in 4th speed and the road grade is 0%. The faster the vehicular speed is, the greater an accelerator opening is set for the steady-state traveling threshold value, as illustrated in the steady-state traveling threshold value map M3. Such steady-state traveling threshold value maps M3 are set for each combination of road grade in certain intervals (e.g., 2% grade intervals) and transmission gears.

The tendency for accelerator opening set by the steady-state traveling threshold value maps for each road grade is as follows. For example, in a steady-state traveling threshold value map for a steep uphill grade, the accelerator opening is set relatively great as compared to a steady-state traveling threshold value map for a less steep uphill grade. In a steady-state traveling threshold value map for a steep downhill grade, the accelerator opening is set relatively small as compared to a steady-state traveling threshold value map for a less steep downhill grade. The first engine revolutions threshold value maps for each road grade are decided by matching.

The tendency for accelerator opening set by the steady-state traveling threshold value maps for each transmission gear is as follows. For example, in a steady-state traveling threshold value map for a high-speed side transmission gear, the accelerator opening is set relatively great as compared to a steady-state traveling threshold value map for a low-speed side transmission gear. The steady-state traveling threshold value maps for each combination of road grade and transmission gear are decided by matching. In determination of whether in steady-state traveling, the accelerator opening threshold value is extracted in according to the current vehicular speed, and determination is made regarding whether the current accelerator opening is within a certain range above and below the accelerator opening threshold value as a median value, using a steady-state traveling threshold value map corresponding to the current transmission gear and road grade being traveled.

Next, the first accelerator opening threshold value map M4 will be described. The first accelerator opening threshold value map M4 is a map where each accelerator opening is set by adding a predetermined value (e.g., several tens of degrees) to the steady-state traveling threshold value map M3. This predetermined value is a value that is sufficiently larger than the above-described certain range used at the time of determining whether steady-state traveling. If the current accelerator opening is equal to or greater than the accelerator opening illustrated in this first accelerator opening threshold value map M4, the driver has depressed the accelerator pedal for acceleration. Such first accelerator opening threshold value maps M4 are set for each combination of road grade in certain intervals and transmission gears, in the same way as with the steady-state traveling threshold value maps M3. The tendencies of accelerator opening set by the first accelerator opening threshold value maps M4 for each road grade, and the tendencies of accelerator opening set by the first accelerator opening threshold value maps M4 for each transmission gear, are tendencies the same as in the steady-state traveling threshold value maps M3. The first accelerator opening threshold value maps M4 for each combination of road grade and transmission gear are decided by matching.

A constant value is set for the accelerator depressing speed threshold value, regardless of current transmission gear and road grade. A value where it can be unmistakably determined that the driver is depressing the accelerator pedal is set for the accelerator depressing speed threshold value. The accelerator depressing speed threshold value is determined by matching.

Description will be made regarding the first insufficient acceleration determination unit 10c. The first insufficient acceleration determination unit 10c determines whether an ON trigger has been detected in first insufficient acceleration determination. Specifically, in a case where the determination results of the insufficient drive force determination unit 10a and the determination results of the first acceleration request determination unit 10b are that the insufficient drive force determination unit 10a has determined that drive force insufficiency will occur, and the first acceleration request determination unit 10b has determined that there is an acceleration request, the first insufficient acceleration determination unit 10c detects an ON trigger for first insufficient acceleration determination. On the other hand, in a case where the insufficient drive force determination unit 10a has determined that drive force insufficiency will not occur, and/or the first acceleration request determination unit 10b has determined that there is not an acceleration request, an ON trigger for first insufficient acceleration determination is undetected.

The high engine revolutions determination unit 10d will be described. The high engine revolutions determination unit 10d determines whether the engine revolutions that will increase due to downshifting, if downshifting is performed from the current transmission gear selected by the driver in temporary manual mode, will be lower than permissible revolutions (i.e., whether downshifting will cause engine revolutions to be too high). Specifically, the high engine revolutions determination unit 10d determines whether the current engine revolutions are lower than a second engine revolutions threshold value. The second engine revolutions threshold value are set in accordance with the current transmission gear and the road grade of the road being traveled, using a second engine revolutions threshold value map, for example. In a case of having determined that the current engine revolutions are lower than the second engine revolutions threshold value, the high engine revolutions determination unit 10d determines that the engine revolutions that will rise due to the downshifting will be smaller than the permissible revolutions.

A second engine revolutions threshold value map M2 will be described with reference to FIG. 2. The graph denoted by symbol M2 in FIG. 2 represents an example of a second engine revolutions threshold value map. This second engine revolutions threshold value map M2 is a map for a road grade of 0%, for example. The faster the current transmission gear is, the higher the engine revolutions are set for the second engine revolutions threshold value in the second engine revolutions threshold value map M2. Particularly, the engine revolutions greatly increase in this case from 2nd gear to 3rd gear, and thereafter the engine revolutions are set to gradually increase after 3rd gear. In a case where the current engine revolutions are lower than the engine revolutions indicated by this second engine revolutions threshold value map M2, the engine revolutions that will increase by downshifting from the current transmission gear will be smaller than the permissible revolutions. The permissible revolutions represent a value of engine revolutions where over-revving will not occur at each transmission gear after downshifting. The engine revolutions at each transmission gear in the second engine revolutions threshold value map M2 are set based on the permissible revolutions. Such second threshold value maps for engine revolutions M2 are set for each road grade in certain intervals (e.g., 2% grade intervals). The tendency for engine revolutions set by the second threshold value maps for engine revolutions M2 for each road grade are the same tendencies as in the first engine revolutions threshold value map described above, for example. The second threshold value maps for engine revolutions M2 for each road grade are decided by matching.

The second acceleration request determination unit 10e will be described. The second acceleration request determination unit 10e determines whether there is a greater acceleration request that is greater than the acceleration request determined by the first acceleration request determination unit 10b (i.e., a strong acceleration intent). Specifically, the second acceleration request determination unit 10e determines whether the accelerator opening is equal to or greater than a second accelerator opening threshold value. In a case where determination is made that the accelerator opening is equal to or greater than a second accelerator opening threshold value, the second acceleration request determination unit 10e calculates the accelerator depressing speed from time-sequence data of the accelerator opening, and determines whether the accelerator depressing speed is equal to or greater than the accelerator depressing speed threshold value (the same threshold value as the threshold value used by the first acceleration request determination unit 10b). In a case where determination is made that the accelerator opening is equal or greater than the second accelerator opening threshold value, and also that the accelerator depressing speed is equal to or greater than the accelerator depressing speed threshold value, the second acceleration request determination unit 10e determines that there is a greater acceleration request.

The second accelerator opening threshold value will be described with reference to FIG. 3. The straight line indicated by symbol S in FIG. 3 represents an example of the second accelerator opening threshold value. This second accelerator opening threshold value S is a constant value, regardless of current transmission gear and road grade. This second accelerator opening threshold value S is set to a value that is greater than all accelerator openings set in the first accelerator opening threshold value maps M4 regarding all combinations of transmission gear and road grade used by the first acceleration request determination unit 10b, and also a value that is smaller than an accelerator opening threshold value K for kick-down determination (e.g., a fill-open accelerator opening). The second accelerator opening threshold value S is decided by matching. Note that the second accelerator opening threshold value may be set in accordance with parameters such as the current transmission gear, the road grade of the road being traveled, the vehicular speed, and so forth, in the same way as the first accelerator opening threshold value.

The second insufficient acceleration determination unit 10f will be described. The second insufficient acceleration determination unit 10f determines whether an ON trigger has been detected in second insufficient acceleration determination. Specifically, in a case where the determination results of the high engine revolutions determination unit 10d and the determination results of the second acceleration request determination unit 10e are that the high engine revolutions determination unit 10d has determined that engine revolutions that will rise due to downshifting will be lower than the permissible revolutions, and the second acceleration request determination unit 10e has determined that there is great acceleration request, the second insufficient acceleration determination unit 10f detects an ON trigger for second insufficient acceleration determination. On the other hand, in a case where the high engine revolutions determination unit 10d has determined that engine revolutions that will rise due to downshifting will be equal to or greater than the permissible revolutions, and/or the second acceleration request determination unit 10e has determined that there is not great acceleration request, an ON trigger for second insufficient acceleration determination is undetected.

The downshift control unit 10g will be described. The downshift control unit 10g executes downshifting in a case where determination has been made of insufficient acceleration at the first stage or the second stage. Specifically, in a case where the first insufficient acceleration determination unit 10c detects an ON trigger for first insufficient acceleration determination or the second insufficient acceleration determination unit 10f detects an ON trigger for second insufficient acceleration determination, the downshift control unit 10g performs control to shift from the current transmission gear to one transmission gear on the slow side.

Figure 4:
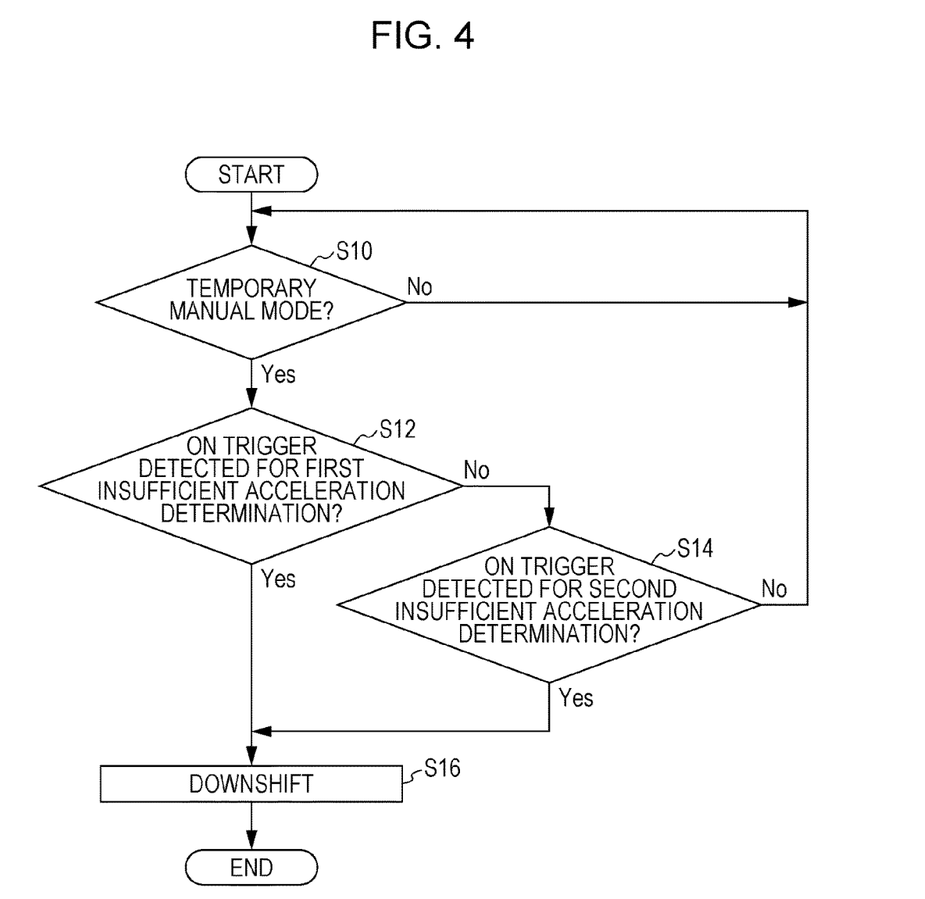
FIG. 4 is a flowchart illustrating the flow of downshift function in temporary manual mode according to an example.
Figure 5:
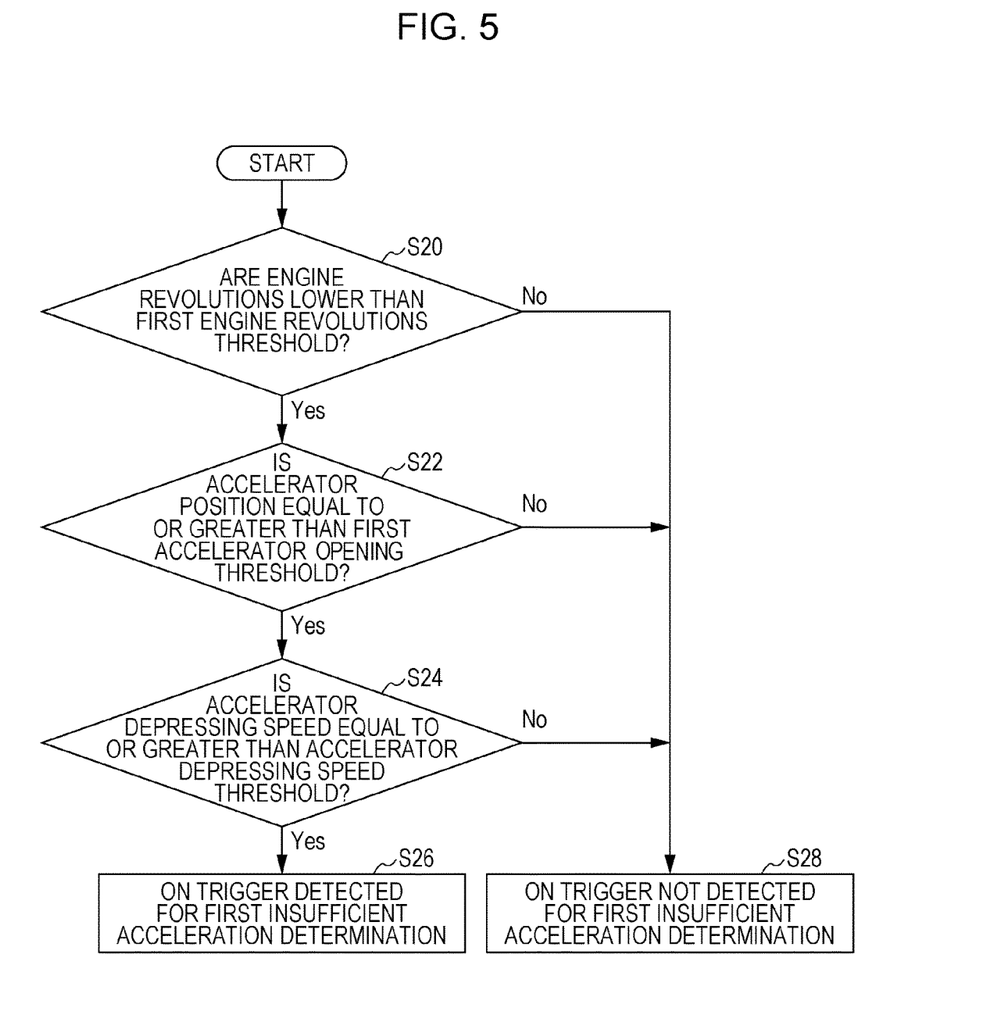
FIG. 5 is a flowchart illustrating the flow of first insufficient acceleration determination in the flowchart in FIG. 4.
Figure 6:
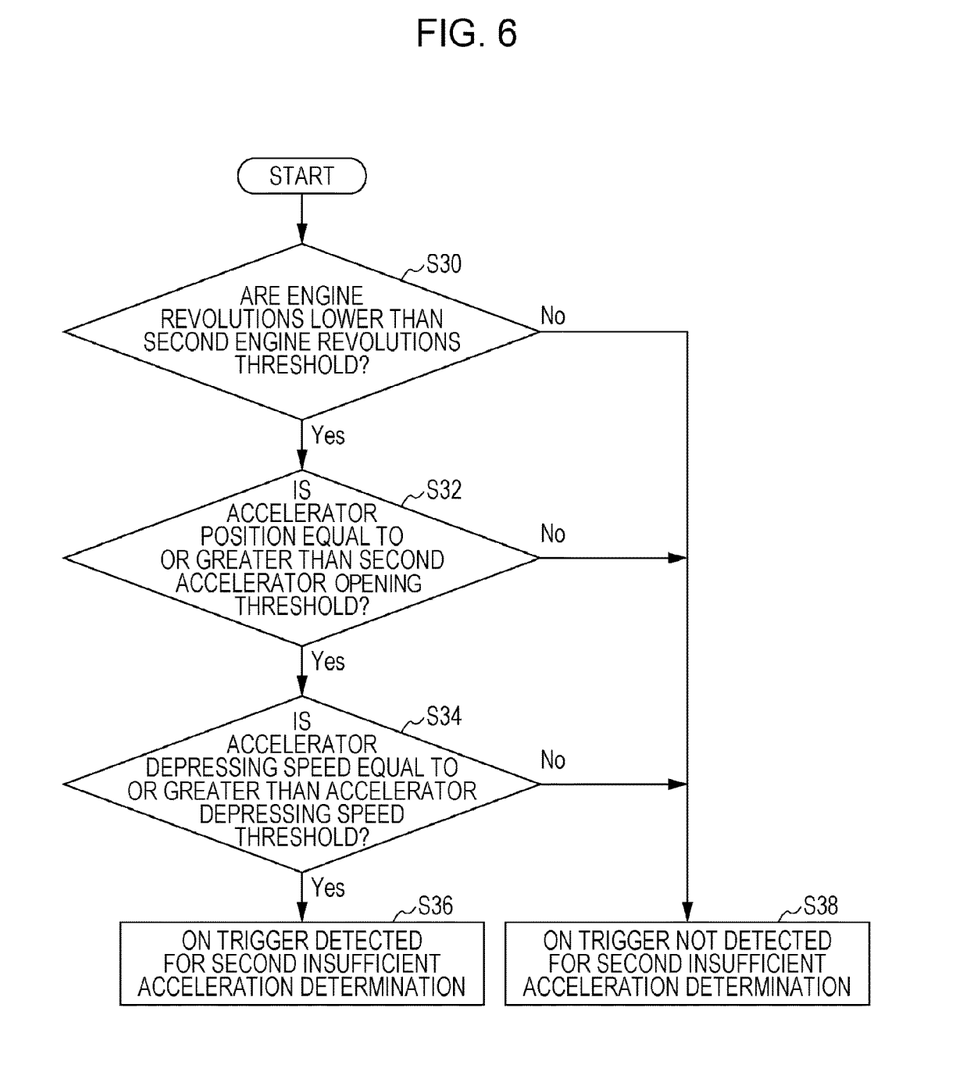
FIG. 6 is a flowchart illustrating the flow of second insufficient acceleration determination in the flowchart in FIG. 4.

The flow of downshift functions during temporary manual mode at the TCU 10 (control device 1) will be described following FIGS. 4 through 6, with reference to FIGS. 1 through 3. FIG. 4 is a flowchart illustrating the flow of downshift functions in temporary manual mode according to the example. FIG. 5 is a flowchart illustrating the flow of first insufficient acceleration determination in the flowchart in FIG. 4. FIG. 6 is a flowchart illustrating the flow of second insufficient acceleration determination in the flowchart in FIG. 4.

The TCU 10 determines whether in the temporary manual mode (S10), as illustrated in FIG. 4. In a case of determining in S10 that the mode is not the temporary manual mode, the TCU 10 performed determination of whether in the temporary manual mode again, after a predetermined amount of time (S10).

In a case of having determined that the mode is the temporary manual mode in S10, the TCU 10 performs first insufficient acceleration determination (S12).

In a case of performing the determination of S12, the TCU 10 sets a first engine revolutions threshold value in accordance with the current transmission gear and road grade, using the first engine revolutions threshold value map M1, and determines whether the current engine revolutions are lower than the first engine revolutions threshold value (S20). In a case of determining in S20 that the current engine revolutions are equal to or greater than the first engine revolutions threshold value (i.e., that drive force insufficiency will not occur if accelerating at the current transmission gear), an ON trigger for the first insufficient acceleration determination by is undetected by the TCU 10 (S28).

In a case of determining in S20 that the current engine revolutions are lower than the first engine revolutions threshold value (i.e., that drive force insufficiency will occur if accelerating at the current transmission gear), the TCU 10 sets a first accelerator opening threshold value in accordance with the current transmission gear, the road grade of the road being traveled, and vehicular speed, using the first accelerator opening threshold value map M4, and determines whether the current accelerator opening is equal to or greater than the first accelerator opening threshold value (S22). In a case where determination is made in S22 that the accelerator opening is smaller than the first accelerator opening threshold value (i.e., there is no acceleration request made by the driver), an ON trigger for the first insufficient acceleration determination is undetected by the TCU 10 (S28).

In a case where determination is made in S22 that the accelerator opening is equal to or greater than the first accelerator opening threshold value, the TCU 10 calculates an accelerator depressing speed from time-sequence data of accelerator opening, and determines whether this accelerator depressing speed is equal to or greater than an accelerator depressing speed threshold value (S24). In a case where determination is made in S24 that the accelerator depressing speed is smaller than the accelerator depressing speed threshold value (i.e., there is no acceleration request made by the driver), an ON trigger for the first insufficient acceleration determination by is undetected by the TCU 10 (S28). On the other hand, in a case where determination is made in S24 that the accelerator depressing speed is equal to or greater than the accelerator depressing speed threshold value (i.e., there is an acceleration request made by the driver), an ON trigger for the first insufficient acceleration determination by is detected by the TCU 10 (S26).

Returning to FIG. 4, in a case where an ON trigger for the first insufficient acceleration determination is undetected (S28) in the determination in S12, the TCU 10 performs second insufficient acceleration determination (S14).

In a case of performing the determination of S14, the TCU 10 sets a second engine revolutions threshold value in accordance with the current transmission gear and the road grade of the road being traveled, using the second engine revolutions threshold value map M2, and determines whether the current are lower than the second engine revolutions threshold value, as illustrated in FIG. 6 (S30). In a case where determination is made in S30 that the current engine revolutions are equal to or greater than the second engine revolutions threshold value (i.e., a case where engine revolutions rising due to downshifting will exceed the permissible revolutions), an ON trigger for the second insufficient acceleration determination by is undetected by the TCU 10 (S38).

In a case where determination is made in S30 that the current engine revolutions are lower than the second engine revolutions threshold value (i.e., a case where engine revolutions rising due to downshifting are lower than the permissible revolutions), the TCU 10 determines whether the current accelerator opening is equal to or greater than a second accelerator opening threshold value (S32). In a case where determination is made in S32 that the current accelerator opening is smaller than the second accelerator opening threshold value (i.e., there is not a great acceleration request made by the driver), an ON trigger for the second insufficient acceleration determination by is undetected by the TCU 10 (S38).

In a case where determination is made in S32 that the current accelerator opening is equal to or greater than the second accelerator opening threshold value, the TCU 10 calculates an accelerator depressing speed from time-sequence data of accelerator opening, and determines whether this accelerator depressing speed is equal to or greater than the accelerator depressing speed threshold value (S34). In a case where determination is made in S34 that the accelerator depressing speed is smaller than the accelerator depressing speed threshold value (i.e., there is no great acceleration request made by the driver), an ON trigger for the second insufficient acceleration determination by is undetected by the TCU 10 (S38). On the other hand, in a case where determination is made in S34 that the accelerator depressing speed is equal to or greater than the accelerator depressing speed threshold value (i.e., there is a great acceleration request made by the driver), an ON trigger for the second insufficient acceleration determination by is detected by the TCU 10 (S36).

Returning to FIG. 4, in a case where an ON trigger for the second insufficient acceleration determination is undetected (S38) in the determination in S14, the TCU 10 determines whether the mode is the temporary manual mode again after a predetermined amount of time (S10).

On the other hand, in a case where an ON trigger for first insufficient acceleration determination by is detected (S26) in the detection in S12 or an ON trigger for the second insufficient acceleration determination by is detected (S36) in the detection in S14, the TCU 10 shifts down from the current transmission gear by one transmission gear in the low speed side (S16). The engine revolutions that had dropped in the transmission gear before downshifting (e.g., transmission gear at the high speed side) rise in accordance with this downshifting. Note however, that the risen engine revolutions are below the permissible revolutions. Sufficient engine torque necessary for acceleration can be generated by the risen engine revolutions. Accordingly, acceleration can be performed in accordance with the acceleration request made by the driver, by the excess drive force.

According to the control device 1 of the present invention, in a case where there is an acceleration request made by the driver when in temporary manual mode, downshifting is executed if one of the conditions of first insufficient acceleration determination or second insufficient acceleration determination are satisfied even if acceleration is insufficient at the transmission gear selected by the driver at that time (i.e., even if engine revolutions have dropped in the current transmission gear), thereby enabling acceleration in accordance with the acceleration intent of the driver. Thus, automatically downshifting at the vehicle side even when in temporary manual mode enables acceleration in accordance with the acceleration intent of the driver to be realized simply by accelerator operations, without necessity operations for the driver to cancel the temporary manual mode or to operate the minus paddle switch 53. Accordingly, the driver does not feel this to be troublesome.

According to the control device 1 of the present invention, performing second insufficient acceleration determination in addition to first insufficient acceleration determination enables downshifting to be maximally executed by determining acceleration to be insufficient in the second insufficient acceleration determination even if insufficient acceleration is not determined in the first insufficient acceleration determination (particularly, in a case where determination of insufficient acceleration is not made when there is an acceleration request), so acceleration can be performed in response to a request by the driver for powerful acceleration. Thus, according to the control device 1 of the present invention, an unnatural sensation that the driver experiences due to the vehicle automatically performing downshifting or not performing downshifting when the driver request acceleration can be suppressed, and acceleration can be performed in accordance with the acceleration intent of the driver.

According to the control device 1 of the present invention, precise determination can be made regarding whether the current state is such that sufficient acceleration cannot be obtained in response to an acceleration operation made by the driving depressing the accelerator pedal, by first insufficient drive force determination and acceleration request determination. Also, according to the control device 1 of the present invention, precise determination can be made regarding whether excess drive force will lack at the current engine revolutions, by determining the current engine revolutions using the first engine revolutions threshold value in accordance with the current transmission gear and road grade. Further, according to the control device 1 of the present invention, precise determination can be made regarding whether the driver is depressing the accelerator pedal for acceleration, by determining the current accelerator opening using the first accelerator opening threshold value in accordance with the current transmission gear, the road grade, and the vehicular speed. Moreover, according to the control device 1 of the present invention, precise determination can be made regarding whether the driver has performed an accelerator operation for acceleration, by determining the accelerator depressing speed using the accelerator depressing speed threshold value.

According to the control device 1 of the present invention, whether the engine revolutions that will rise due to downshifting will be lower than the permissible revolutions can be precisely determined, so as to maximally downshift in a case where the driver has further depressed the accelerator pedal, by high engine revolutions determination and acceleration request determination in the second insufficient acceleration determination. Also, according to the control device 1 of the present invention, whether the engine revolutions that will rise due to downshifting will be lower than the permissible revolutions can be precisely determined, by determining the current engine revolutions using the second engine revolutions threshold value in accordance with the current transmission gear and road grade. Further, according to the control device 1 of the present invention, whether the driver has further depressed the accelerator pedal for acceleration can be precisely determined, by determining the current accelerator opening using the second accelerator opening threshold value in accordance with the current transmission gear and road grade.

While an example of the present invention has been described, the present invention is not restricted to the above example, and various modifications may be made. For example, while the present invention has been applied to a chain type continuously variable transmission 3 in the above example, the present invention may be applied to other continuously variable transmissions such as belt-type or toroidal continuously variable transmissions, or other automatic transmissions such as automatic transmission (AT) or dual-clutch transmission (DCT) as well, for example, instead of a chain type continuously variable transmission.

Although the example has been described in the example as being applied to a continuously variable transmission 3 having a manual shift mode in addition to the automatic shift mode and temporary manual mode, this is applicable to a continuously variable transmission 3 that does not have a manual shift mode (automatic transmission) as well.

Although a configuration has been described in the example where downshifting is executed in a case where one of first insufficient acceleration determination or second insufficient acceleration determination is satisfied in the temporary manual mode, a configuration may be made where downshifting is performed in a case where the first insufficient acceleration determination is made in the temporary manual mode, without performing the second insufficient acceleration determination.

Although a configuration has been described in the example where a method is used to determine whether the current engine revolutions are lower than a threshold value indicated in a map, as a method to determine insufficient drive force, other methods may be used. For example, a method may be made where excess drive force is obtained, and determination is made by whether the excess drive force is smaller than a threshold value.

Although a configuration has been described in the example where a method is used to determine whether the accelerator opening is equal to or greater than a threshold value and the accelerator depressing speed is equal to or greater than a threshold value, as a method to determine acceleration request, other methods may be used. For example, a method may be used to determine simply according to whether the accelerator opening is equal to or greater than a threshold value, or a method may be used to determine simply according to whether the accelerator depressing speed is equal to or greater than a threshold value.

Although a configuration has been described in the example where the first engine revolutions threshold value and the second engine revolutions threshold value are set in accordance with the current transmission gear and road grade, a configuration may be made where setting is performed in accordance with one or the other of the current transmission gear and road grade, or alternatively, a configuration may be made where setting is performed taking other parameters into consideration as well.

Although a configuration has been described in the example where the first accelerator opening threshold value is set in accordance with the current transmission gear and the road grade of the road being traveled and the vehicular speed, a configuration may be made where setting is performed in accordance with at least one parameter of the current transmission gear, the road grade of the road being traveled, or the vehicular speed, or alternatively, a configuration may be made where setting is performed taking other parameters into consideration as well.

The invention claimed is:

1. A control device for an automatic transmission that includes at least an automatic shift mode where gearshift is performed automatically in accordance with a state in which a vehicle is traveling, and a temporary manual mode where a transmission gear is temporarily downshifted or upshifted in accordance with driver operations until cancelation conditions are established in the automatic shift mode, the control device comprising:

an insufficient drive force determination unit configured to determine whether a drive force insufficiency occurs in a case where acceleration is performed in a transmission gear selected by the driver in the temporary manual mode;

an acceleration request determination unit configured to determine whether there is an acceleration request made by the driver of the vehicle; and a downshift control unit configured to downshift to a transmission gear on a lower speed side from the transmission gear selected by the driver, in a case where, in the temporary manual mode, determination is made by the insufficient drive force determination unit that the drive force insufficiency occurs and determination is made by the acceleration request determination unit that there is the acceleration request;

a high engine revolutions determination unit configured to determine whether a first number of engine revolutions that rise in a case of downshifting from the transmission gear selected by the driver to a transmission gear on the lower speed side is lower than a permissible revolutions number; and a second acceleration request determination unit configured to determine whether there is an acceleration request greater than the acceleration request determined by the acceleration request determination unit, wherein, in a case where determination is made in the temporary manual mode by the insufficient drive force determination unit that the drive force insufficiently does not occur, the downshift control unit performs downshift from the transmission gear selected by the driver to a transmission gear on the lower speed side, in a case where determination is made by the high engine revolutions determination unit that the first number of engine revolutions is lower than the permissible revolutions number and determination is made by the second acceleration request determination unit that the acceleration request is greater than the acceleration request.

2. The control device for an automatic transmission according to claim 1, further comprising:

an engine revolutions detection unit configured to detect a second number of engine revolutions of the vehicle, wherein the insufficient drive force determination unit determines whether the second number of engine revolutions of the vehicle is lower than a first engine revolutions threshold value, and in a case where the second number of engine revolutions of the vehicle is lower than the first engine revolutions threshold value, determines that the drive force insufficiency occurs.

3. The control device for an automatic transmission according to claim 2, wherein the first engine revolutions threshold value is set in accordance with at least one of the transmission gear selected by the driver and a road grade of a road over which the vehicle is traveling.

4. The control device for an automatic transmission according to claim 2, wherein the control device determines whether the second number of engine revolutions of the vehicle is lower than a second engine revolutions threshold value that is higher than the first engine revolutions threshold value, and in a case where determination is made that the second number of engine revolutions of the vehicle is lower than the second engine revolutions threshold value, determines that a first number is lower than the permissible revolutions number.

5. The control device for an automatic transmission according to claim 4, wherein the second engine revolutions threshold value is set in accordance with at least one of the transmission gear selected by the driver or a road grade of a road over which the vehicle is traveling.

6. The control device for an automatic transmission according to a claim 1, further comprising:
an accelerator opening detection unit configured to detect an accelerator opening according to an accelerator pedal operation by the driver,
wherein the acceleration request determination unit determines whether the accelerator opening detected by the accelerator opening detection unit is equal to or greater than a first accelerator opening threshold value, and in a case where the accelerator opening is equal to or greater than the first accelerator opening threshold value, determines that there is the acceleration request.

7. The control device for an automatic transmission according to claim 6, wherein the first accelerator opening threshold value is set in accordance with at least one of the transmission gear selected by the driver, a road grade of a road over which the vehicle is traveling, or a vehicular speed.

8. The control device for an automatic transmission according to claim 1, further comprising:
an accelerator opening detection unit configured to detect an accelerator opening according to an accelerator pedal operation by the driver,
wherein the acceleration request determination unit determines whether an accelerator depressing speed calculated from the accelerator opening detected by the accelerator opening detection unit is equal to or greater than an accelerator depressing speed threshold value, and in a case of determining that the accelerator depressing speed is equal to or greater than the accelerator depressing speed threshold value, determines that there is the acceleration request.

9. The control device for an automatic transmission according to claim 6, wherein the acceleration request determination unit determines whether the accelerator opening detected by the accelerator opening detection unit is equal to or greater than the first accelerator opening threshold value, and determines whether an accelerator depressing speed calculated from the accelerator opening detected by the accelerator opening detection unit is equal to or greater than an accelerator depressing speed threshold value, and in a case of determining that the accelerator opening is equal to or greater than the first accelerator opening threshold value and that the accelerator depressing speed is equal to or greater than the accelerator depressing speed threshold value, determines that there is the acceleration request.

10. The control device for an automatic transmission according to claim 6, wherein the control device determines whether the accelerator opening detected by the accelerator opening detection unit is equal to or greater than a second accelerator opening threshold value that is greater than the first accelerator opening threshold value, and in a case of determining that the accelerator opening is equal to or greater than the second accelerator opening threshold value, determines that there is an acceleration request greater than the acceleration request.

11. The control device for an automatic transmission according to claim 6, wherein the control device determines whether an accelerator depressing speed calculated from the accelerator opening detected by the accelerator opening detection unit is equal to or greater than an accelerator depressing speed threshold value, and in a case of determining that the accelerator depressing speed is equal to or greater than the accelerator depressing speed threshold value, determines that there is an acceleration request greater than the acceleration request.

12. The control device for an automatic transmission according to claim 10, wherein the second acceleration request determination unit determines whether the accelerator opening detected by the accelerator opening detection unit is equal to or greater than the second accelerator opening threshold value, and determines whether an accelerator depressing speed calculated from the accelerator opening detected by an accelerator opening detection unit is equal to or greater than the accelerator depressing speed threshold value, and in a case of determining that the accelerator opening is equal to or greater than the second accelerator opening threshold value and that the accelerator depressing speed is equal to or greater than the accelerator depressing speed threshold value, determines that there is an acceleration request greater than the acceleration request.

13. The control device for an automatic transmission according to claim 1, wherein, in a case where the second number of engine revolutions of the vehicle is lower than the first engine revolutions threshold value, the control device determines that the drive force insufficiency occurs.

14. An automatic transmission, comprising:
a controller;
a memory storing instructions; and
a processor coupled to the memory,
wherein the automatic transmission includes at least an automatic shift mode where gearshift is performed automatically in accordance with a state in which a vehicle is traveling, and a temporary manual mode where a transmission gear is temporarily downshifted or upshifted in accordance with driver operations until cancelation conditions are established in the automatic shift mode,
wherein the processor executes the instructions such that the controller controls:
an insufficient drive force determination unit configured to determine whether a drive force insufficiency occurs in a case where acceleration is performed in a transmission gear selected by the driver in the temporary manual mode;
an acceleration request determination unit configured to determine whether there is an acceleration request made by the driver of the vehicle;
a downshift control unit configured to downshift to a transmission gear on a lower speed side from the transmission gear selected by the driver, in a case where, in the temporary manual mode, determination is made by the insufficient drive force determination unit that the drive force insufficiency occurs and determination is made by the acceleration request determination unit that there is the acceleration request,
a high engine revolutions determination unit configured to determine whether a first number of engine revolutions that rise in a case of downshifting from the transmission gear selected by the driver to a transmission gear on the lower speed side is lower than a permissible revolutions number; and
a second acceleration request determination unit configured to determine whether there is an acceleration request greater than the acceleration request determined by the acceleration request determination unit, and
wherein, in a ease where determination is made in the temporary manual mode by the insufficient drive force determination Unit that the drive force insufficiency does not occur, the downshift control unit performs downshift from the transmission gear selected by the driver to a transmission gear on the lower speed side, in a case where determination is made by the high engine revolutions determination unit that the first number of engine revolutions is lower than the permissible revolutions number and determination is made by the second acceleration request determination unit that the acceleration request is greater than the acceleration request.

15. The automatic transmission according to claim 14, wherein the processor further executes the instructions such that the controller controls:
   an engine revolutions detection unit configured to detect a second number of engine revolutions of the vehicle, and
   wherein the insufficient drive force determination unit determines whether the second number of engine revolutions of the vehicle is lower than a first engine revolutions threshold value, and in a case where the second number of engine revolutions of the vehicle is lower than the first engine revolutions threshold value, determines that the drive force insufficiency occurs.

\* \* \* \* \*